United States Patent [19]

Gaschler et al.

[11] 4,351,278
[45] Sep. 28, 1982

[54] DRIVE AGGREGATE FOR A HEAT PUMP

[75] Inventors: Erich Gaschler; Cornelia Schwarz, both of Wolfsburg, Fed. Rep. of Germany

[73] Assignee: Volkswagenwerk AG, Wolfsburg, Fed. Rep. of Germany

[21] Appl. No.: 125,536

[22] Filed: Feb. 28, 1980

[30] Foreign Application Priority Data

Mar. 5, 1979 [DE] Fed. Rep. of Germany ....... 2908434

[51] Int. Cl.³ ............................................. F02B 35/00
[52] U.S. Cl. ............................... 123/195 R; 417/364; 62/323.1; 74/604
[58] Field of Search ................... 417/364, 237, 380; 62/323.1; 74/603, 604; 123/195 R, 192

[56] References Cited

U.S. PATENT DOCUMENTS 1,701,402  2/1929  Bower ............................. 74/604
2,500,366  3/1950  Lamberton ...................... 417/364
3,013,542 12/1961  Freyn .......................... 123/195 R

*Primary Examiner*—Craig R. Feinberg
*Attorney, Agent, or Firm*—Spencer & Kaye

[57] ABSTRACT

A drive aggregate for a heat pump includes a common cylinder block which combines a heat pump compressor and an internal combustion engine driving the compressor. Bearings mounted in the cylinder block support a common crankshaft which serves both the engine and the compressor and which is formed of a first crankshaft part and a second crankshaft part. The two crankshaft parts (engine-side and compressor-side crankshaft parts) have adjoining end portions which are mutually non-rotatably interconnected. The bearings comprise a first and a second end bearing. The second end bearing supports both adjoining end portions, whereas the first end bearing supports the other end of the first crankshaft part. Between the first and the second end bearings there is situated at least one intermediate bearing which is split for permitting lateral installation thereof on the first crankshaft part. The first crankshaft part has, adjacent the first end bearing, a terminal crank arm, one portion of which is detachable from the first crankshaft part. Likewise, the intermediate bearing is detachably secured to the cylinder block. Thus, after detaching the crank arm portion and the intermediate bearing, the first crankshaft part is removable, by longitudinal displacement, from the second end bearing and thereafter from the cylinder block.

3 Claims, 4 Drawing Figures

DRIVE AGGREGATE FOR A HEAT PUMP

BACKGROUND OF THE INVENTION

This invention relates to a drive aggregate for a heat pump and comprises a compressor as well as an internal combustion engine driving the compressor. The engine and the compressor are combined into a structural unit by means of a cylinder block which accommodates both the compressor cylinders and the engine cylinders and which also supports a common crankshaft by means of a plurality of bearings. The crankshaft is composed of a compressor-side crankshaft part and an engine-side crankshaft part which are secured to one another in axial alignment by interengaging end portions in the zone of a bearing common to both crankshaft parts. The common bearing is one of the two end bearings of the engine-side crankshaft part. The end bearing which is remote from the compressor side is designated as a first end bearing, whereas the end bearing adjoining the compressor side is designated as a second end bearing. With the engine-side crankshaft part there is associated at least one intermediate bearing which is situated between the two end bearings and which is a split bearing for permitting its lateral mounting on the engine-side crankshaft part.

A drive aggregate of the above-outlined type, in which thus the crankshaft is, for reasons of assembly, formed of two mutually relatively non-rotatable crankshaft parts, is disclosed in U.S. Pat. application by Hofbauer et al., Ser. No. 84,137 filed Oct. 12, 1979.

SUMMARY OF THE INVENTION

It is an object of the invention to provide an improved heat pump drive aggregate of the above-outlined type in which the installation and removal of the crankshaft is facilitated without increasing the dimensions of the drive aggregate.

This object and others to become apparent as the specification progresses, are accomplished by the invention, according to which, briefly stated, the above-noted intermediate bearing is detachably secured to the cylinder block proper and further, one portion of the terminal crank arm of the engine-side crankshaft part adjacent the above-noted first end bearing is detachably secured to the engine-side crankshaft part, so that after removing the securing means for the intermediate bearing and the crank portion, the engine-side crankshaft part may be pulled out from the zone of the end bearings longitudinally and can be removed from the cylinder block.

By detachably mounting one portion of the terminal crank arm of the crankshaft as well as the intermediate bearing, it is feasible to insert the split intermediate bearing on the engine-side crankshaft part before the installation of the latter in the cylinder block and to push the crankshaft to such an extent through the tunnel-shaped receiving member of the first end bearing that the terminus of the engine-side crankshaft part oriented towards the compressor can be aligned with respect to the intermediate bearing and the axis of the compressor-side crankshaft part. Subsequently, the engine-side crankshaft part is brought into its final position by longitudinal displacement, and then the detachable part of the terminal crank arm of the crankshaft and the intermediate bearing are affixed, preferably by bolts, to the crankshaft and the cylinder block, respectively.

DESCRIPTION OF THE PREFERRED EMBODIMENT

Figure 1:
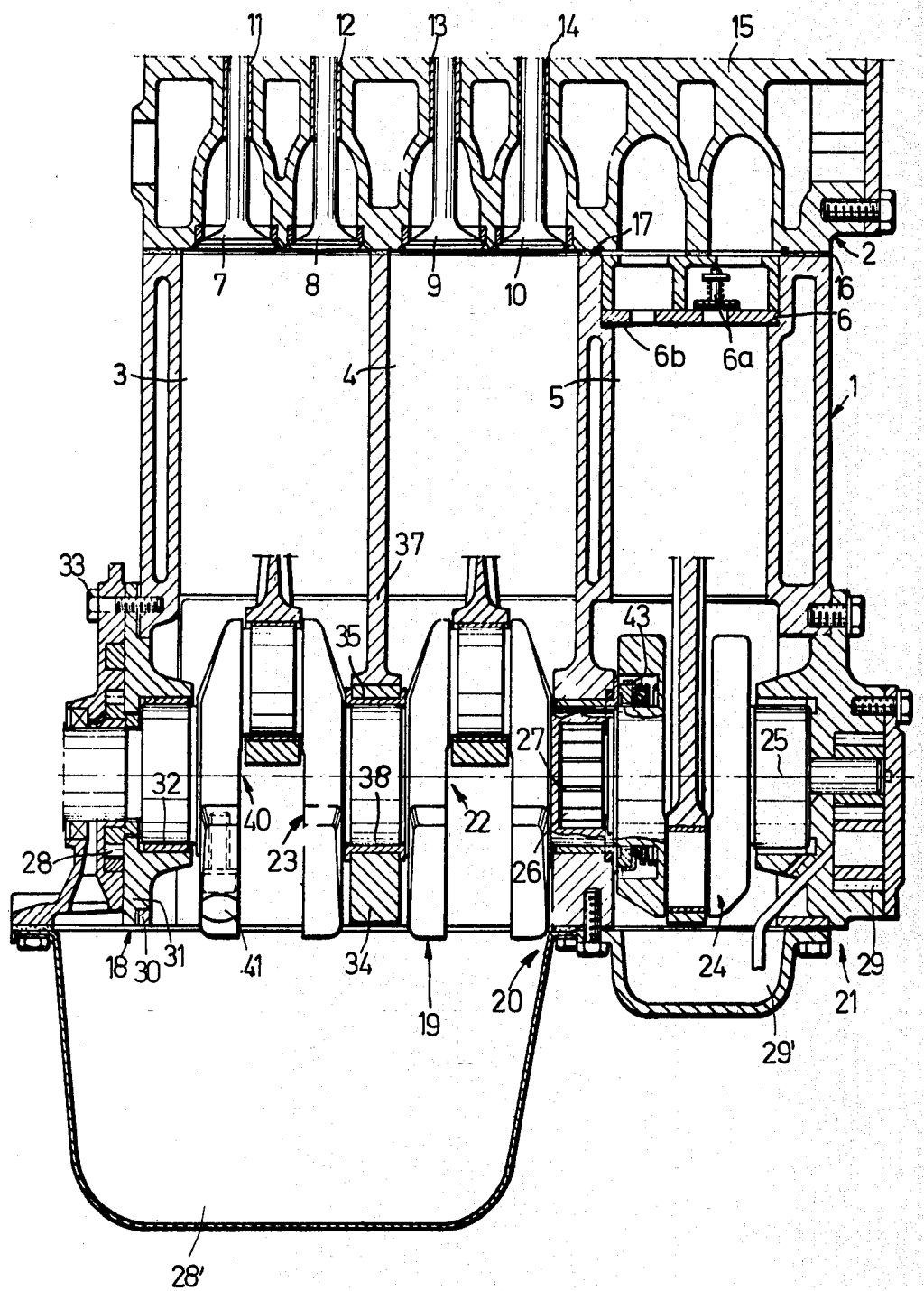
FIG. 1 is a sectional elevational view of a preferred embodiment of the invention.

Turning first to FIG. 1, there is shown a common cylinder block generally indicated at 1 and a common cylinder head generally indicated at 2 for a compressor and an internal combustion engine of a drive aggregate for a heat pump. It is an advantage of such a compact structure that for accommodating the components of the compressor there may be utilized portions of a cylinder block and a cylinder head mass-manufactured for internal combustion engines. In the presently-described embodiment it is assumed that the internal combustion engine has two cylinders 3 and 4, whereas the compressor has only one cylinder 5. The cylinder 5 of the compressor is formed by a cylinder block cavity which is otherwise used for accommodating a cylinder of an internal combustion engine. Since the cylinder of the compressor may be shorter than the engine cylinders, in the cylinder block cavity forming the compressor cylinder there is arranged a valve plate 6 which is recessed with respect to the highest location of the cavity and bears valves 6a and 6b. Accordingly, the cylinder head 2 is provided with valves 7, 8, 9, 10 and associated respective valve stem guide passages 11, 12, 13 and 14 only in the zones of the engine cylinders 3 and 4, whereas the compressor-side zone 15 of the common cylinder head 2 has no valve guides. In other respects, however, no adaptations or changes are necessary. Between the cylinder block 1 and the cylinder head 2 there is provided a conventional cylinder head gasket 16 which is reinforced by an additional O-ring seal 17 surrounding the cylinder 5 of the compressor.

In the cylinder block 1 there are arranged four bearings 18, 19, 20 and 21 which support a common crankshaft 22 formed of an engine-side crankshaft part 23 and a compressor-side crankshaft part 24. The bearings 18 and 20 are first and second end bearings for the engine-side crankshaft part 23. The crankshaft parts 23 and 24 have a common crankshaft axis 25. The coupling of the two crankshaft parts 23 and 24 to one another is effected in a space-saving manner inside of the end bearing 20 which may also be designated as a common end bearing for the two crankshaft parts 23 and 24. As it may be observed in FIG. 1, the right-hand end of the engine-side crankshaft part 23 receives, in a recess 26, the adjoining end 27 of the compressor-side crankshaft part 24. A firm, relatively non-rotatable interengaging connection between the two crankshaft parts 23 and 24 is ensured by providing the inner face of the recess 26 and the outer face of the end 27 with meshing elements, such as teeth.

In the zone of the bearings 18 and 21 there are arranged oil pumps 28 and 29 which deliver oil from separated oil pans 28' and 29' to the internal combustion engine and the compressor, respectively.

The end bearing 18 which is situated remote from the compressor-side crankshaft part 24 and which supports an end of the engine-side crankshaft part 23, comprises a tunnel-shaped receiving part 30 for a bearing 31 proper which, in its inside, supports a bearing shell 32. The bearing 31 is secured detachably to the left-hand terminal wall of the cylinder block 1 by means of bolts 33. The detachability of the bearing 31 is of importance for obtaining an opening of large diameter of the left-hand terminal wall of the cylinder block 1 for the purpose of mounting the engine-side crankshaft part 23.

The structure of the intermediate bearing 19 is also of significance as concerns the mounting of the crankshaft part 23. The intermediate bearing 19 is, transversely with respect to an axial plane extending perpendicularly to the plane of the drawing of FIG. 1, divided into two bearing parts 34 and 35, whose shape and interconnection by means of bolts 36 may be seen in detail in FIGS. 2 and 3. The bearing parts 34 and 35 are rib-reinforced cast components. Further, the intermediate bearing 19 is not mounted fixedly to the associated bearing bracket 37, but is detachably secured thereto by means of bolts 36. This arrangement permits the intermediate bearing 19, composed of parts 34 and 35 to be inserted on the engine-side crankshaft part 23 prior to the installation thereof, then to be secured, in a manner to be described below, in its final position shown in FIG. 1, and to be secured thereafter to the associated bearing bracket 37. In other respects the intermediate bearing 19 is shaped in a conventional manner, thus, it has a bearing shell 38 (shown only in FIG. 1) as well as a lubricant supply means 39. As particularly well seen in FIG. 2, when the bolts 36 are unscrewed from the bearing bracket 37, both bearing parts 34 and 35 have, from their location of installation, a freedom of motion which is transverse to the bearing axis. The bearing axis coincides with the crankshaft axis 25. Thus, as will be described below in connection with FIG. 4, the engine-side crankshaft part 23 can be installed or removed from below, that is, transversely to its own axis, while carrying thereon the two bearing parts 34 and 35 of the intermediate bearing 19.

Figure 4:
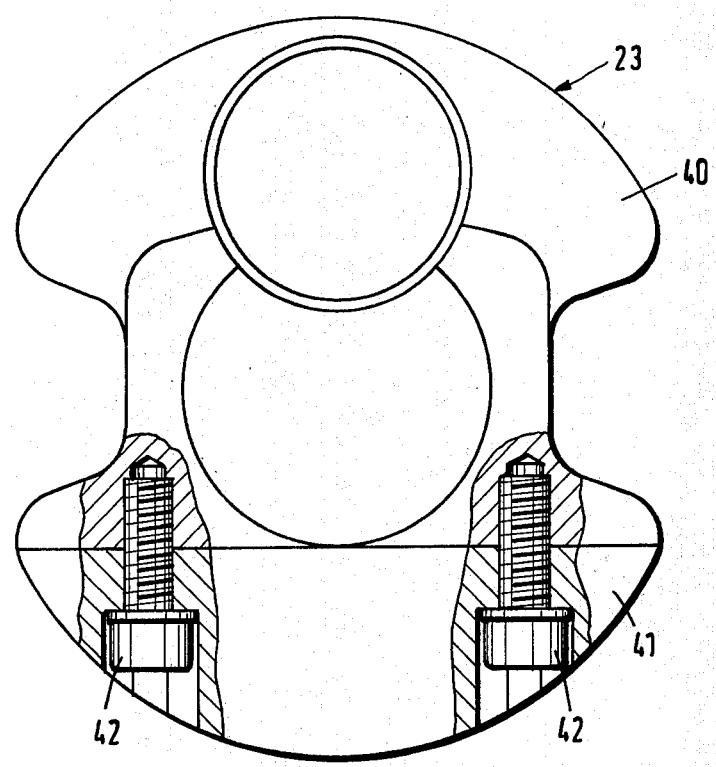
FIG. 4 is a sectional view, on an enlarged scale, taken on line IV—IV of FIG. 1.

Turning now to FIG. 4, the terminal crank arm 40 of the engine-side crankshaft part 23 adjacent the first end bearing 18 has a rear portion 41 which is detachably secured to the crankshaft part 23 by two bolts 42. After removal of the crankshaft portion 41 and disassembly of the bearing parts 31, 32 from the end bearing 18 and prior to securing the parts 34 and 35 of the intermediate bearing 19 to the associated bearing bracket 37, it is thus possible to pass the engine-side crankshaft part 23 from below rightward (as viewed in FIG. 1) with its left-hand terminal portion through the bearing opening of the end bearing 18 until the right-hand end of the engine-side crankshaft part 23 is, with its opening 26 aligned with the axis of the bearing 20 and then to shift the crankshaft part 23 towards the right (as viewed in FIG. 1) into its final position. Thereafter, the various detachable components are installed and the crank zones of the cylinder block 1 are hermetically closed with respect to one another and with respect to the surrounding environment by closures which, at the same time, form oil pans 28' and 29'. A slide ring seal 43 which also serves for sealing the crankcase space of the internal combustion engine and the compressor from one another, is, for achieving a compact structure, integrated in components of the compressor-side crankshaft part 24 and the common end bearing 20.

It is to be understood that a disassembly of the engine-side crankshaft part 23 can be effected by loosening and removing the mounting means of the detachable components. After such a removal the crankshaft part 23 is displaced leftward and then the right-hand end of the crankshaft part 23 is lowered so that the crankshaft part 23 may be removed in a downward direction.

Such a solution for the installation and removal of the engine-side crankshaft part can also find application in case of a plurality of intermediate bearings, rather than a sole intermediate bearing 19. In such a case then all intermediate bearings have to be detachably secured to the associated bearing brackets.

Figure 2:
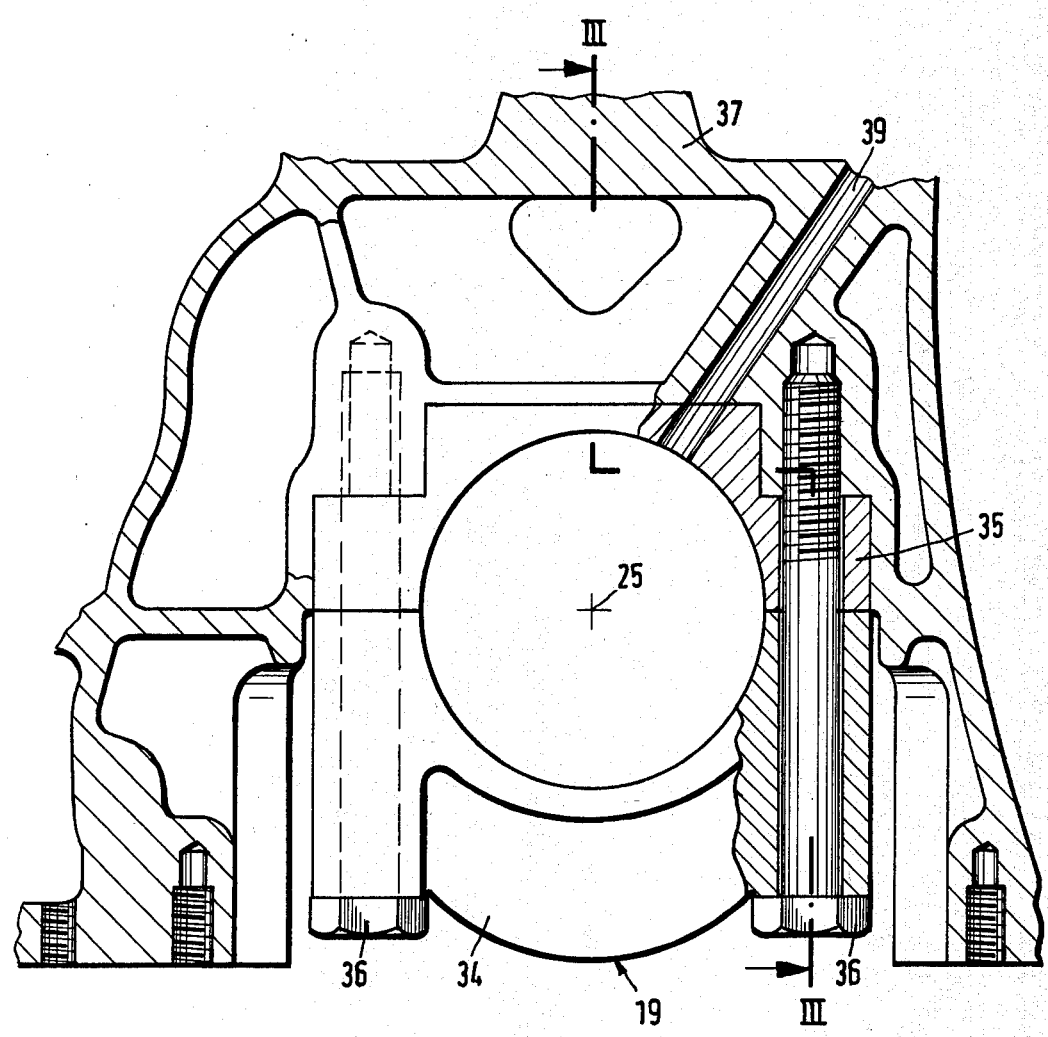
FIG. 2 is a sectional view on an enlarged scale, taken on line II—II of FIG. 1.
Figure 3:
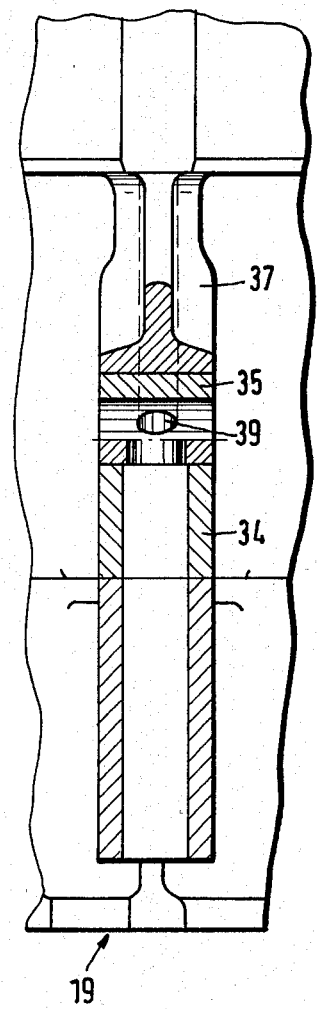
FIG. 3 is a sectional view taken on line III—III of FIG. 2.

The installation and removal of the compressor-side crankshaft part 24 causes no difficulties, since the bearing 21, as shown in FIG. 2, is detachably secured to the right-hand terminal wall of the cylinder block 1. It is to be understood, however, that in principle it is feasible to apply the invention—that is, a detachable arrangement of certain components and bearings—for the compressor-side crankshaft part 24 as well.

It will be understood that the above description of the present invention is susceptible to various modifications, changes and adaptations, and the same are intended to be comprehended within the meaning and range of equivalents of the appended claims.

What is claimed is:

1. In a drive aggregate for a heat pump including a compressor and an internal combustion engine driving the compressor; a common cylinder block including at least one engine cylinder and at least one compressor cylinder; a plurality of bearings mounted in and supported by the cylinder block; a crankshaft supported by the bearings and serving both the engine and the compressor; the crankshaft being formed of an engine-side crankshaft part and a compressor-side crankshaft part; one of the crankshaft parts being a first crankshaft part and the other of the crankshaft parts being a second crankshaft part and having a common longitudinal axis; two of said bearings being first and second end bearings; said second end bearing supporting adjoining end portions of both said first and second crankshaft parts; said first end bearing being situated remote from said second end bearing and supporting said first crankshaft part; said first crankshaft part having a terminal crank arm adjacent said first end bearing; said crankshaft parts being mutually relatively non-rotatably secured to one another at said adjoining end portions; at least one further one of said bearings being an intermediate bearing having an axis and being situated between said first and second end bearings; said intermediate bearing having a split structure formed of first and second bearing parts for a lateral installation on said first crankshaft part; the improvement wherein said terminal crank arm has a removable portion; the improvement further comprising first means for detachably mounting said first and second bearing parts of said intermediate bearing to one another and to said cylinder block at a location of installation to permit said first crankshaft part to be movable to and from said location of installation in a direction substantially transverse to said longitudinal axis of said first crankshaft part; said first and second bearing parts having, in a released state of said first means, a freedom of motion to and from said location of installation in a direction transverse to said axis of said intermediate bearing and second means for detachably securing the removable terminal crank arm portion to said first crankshaft part.

2. A drive aggregate as defined in claim 1, further comprising means defining an opening in a wall of said cylinder block for accommodating said first end bearing; and third means detachably securing said first end bearing to said wall, whereby upon release of said third means said first bearing is removable from said opening parallel to the longitudinal axis of said crankshaft.

3. A drive aggregate as defined in claim 1, wherein said first crankshaft part is said engine-side crankshaft part and said second crankshaft parts is said compressor-side crankshaft part and further wherein said first end bearing is situated remote from said compressor-side crankshaft part and supports said engine-side crankshaft part.

* * * * *